April 3, 1928.  N. RAMGREN  1,664,704
CREAM COOLER
Filed June 19, 1926
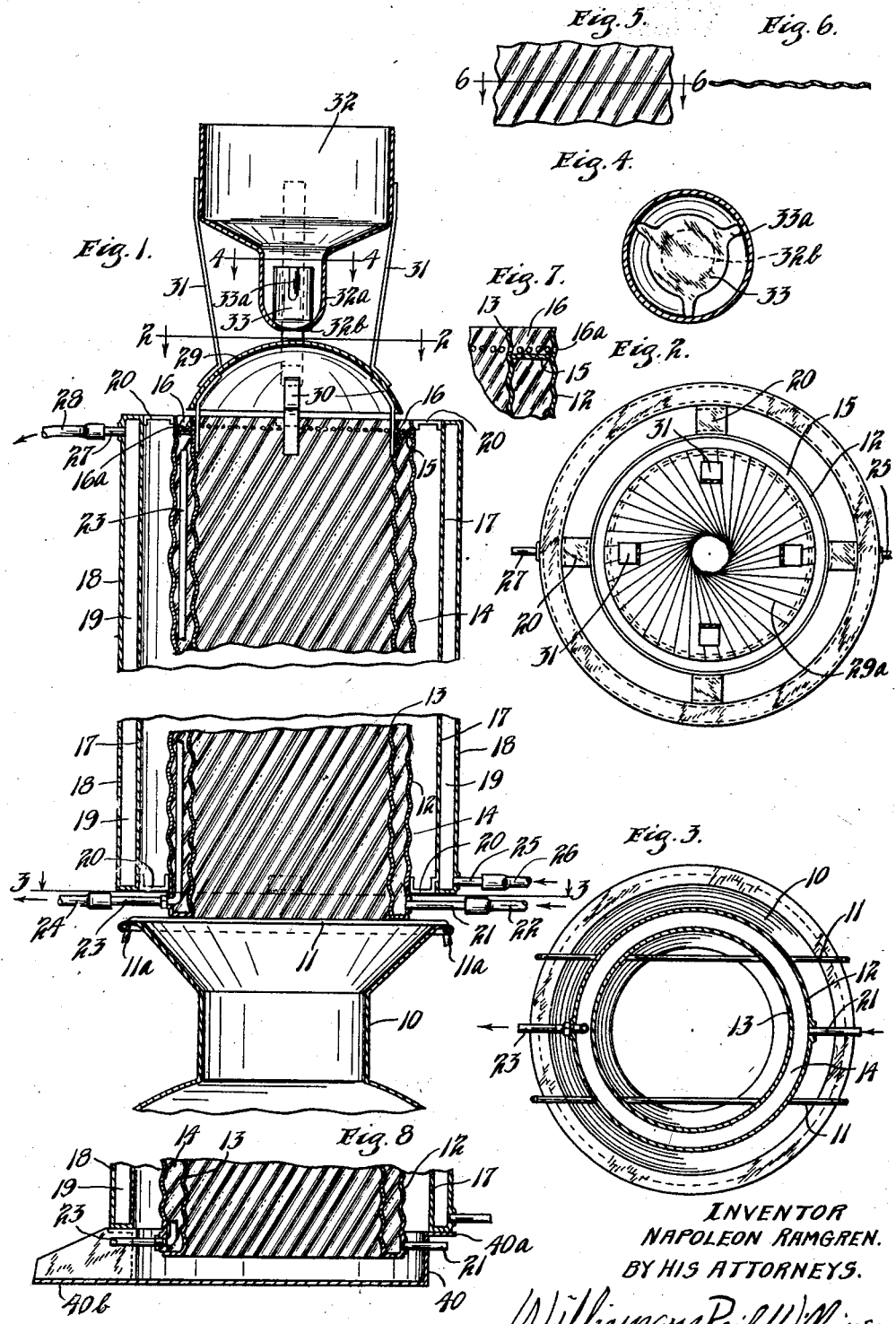
INVENTOR
NAPOLEON RAMGREN.
BY HIS ATTORNEYS.

Patented Apr. 3, 1928.

1,664,704

UNITED STATES PATENT OFFICE.

NAPOLEON RAMGREN, OF OGILVIE, MINNESOTA.

CREAM COOLER.

Application filed June 19, 1926. Serial No. 117,210.

This invention relates to a cooling apparatus such as an apparatus for cooling cream or milk, and while the apparatus and features of the invention are applicable to various situations, in the embodiment of the invention illustrated they are particularly adapted to cooling cream as it comes from the separator. As is well known to those skilled in the art, it is now a common practice for farmers and dairymen to separate the cream from the milk when the same are quite fresh, the separated cream thus being taken or shipped to the creamery. It is desirable to cool the cream before it is placed in the cans for transportation.

It is an object of this invention, therefore, to provide a simple and efficient cream or liquid cooling apparatus.

It is a further object to provide a simple and efficient form of cream or liquid cooling apparatus having means for receiving the cream as it comes from the separator, distributing the same over cooling surfaces and delivering the same to a milk or cream can which receives the cream.

It is a further object of the invention to provide a cream or liquid cooling apparatus having spaced substantially concentric cylindrical members forming a comparatively narrow chamber therebetween over the outer surfaces of which the cream or liquid is distributed, said surfaces preferably having grooves formed therein, together with means for circulating a cooling medium in said chamber.

It is still another object of the invention to provide such an apparatus as set forth in the preceding paragraph, about which is disposed and spaced comparatively close thereto, a second annular member having a hollow chamber therein through which a cooling medium is circulated.

It is more specifically an object of the invention to provide a cream or liquid cooling apparatus having a receptacle at its upper end adapted to receive the cream from the separator and distribute the same over a downwardly flaring member preferably having grooves formed in its surface, which member has a lower terminal edge alined with and spaced above a trough through which the cream is delivered, said trough delivering the cream to the inner and outer surfaces of an annular substantially cylindrical member through which a cooling medium is circulated, the device having means for supporting the same at the top of the milk or cream can.

These and other objects and advantages of the invention will be fully set forth in the following description made in connection with the accompanying drawings, in which like reference characters refer to similar parts throughout the several views and in which:—

Fig. 1 is a central vertical section through the device;

Fig. 2 is a horizontal section taken on line 2—2 of Fig. 1;

Fig. 3 is a horizontal section taken on line 3—3 of Fig. 1;

Fig. 4 is a horizontal section taken on line 4—4 of Fig. 1;

Fig. 5 is a partial view in side elevation of a side of the cylinder used;

Fig. 6 is a horizontal section taken on line 6—6 of Fig. 5, all of the said sections being taken as indicated by the arrows in said lines;

Fig. 7 is a partial radial section through a portion of the device; and

Fig. 8 is a partial vertical section showing a modification.

Referring to the drawings, a device is shown adapted to be supported upon or adjacent the top of a milk can such as illustrated as 10 in Fig. 1.

While the device can be thus variously supported, in the embodiment of the invention illustrated the same is shown as having spaced rods or wires 11 adapted to extend across the top of the can 10, at each side of the center thereof and having their ends bent downwardly as shown at 11ª at the edge of the can. Supported upon and secured to the wires or rods 11 in any suitable manner, as by spot-welding, are a pair of substantially concentric cylinders 12 and 13 spaced slightly apart to form a narrow annular chamber 14. Cylinders 12 and 13 are connected at their bottoms to close the bottom of the chamber 13 and a partition 15 is shown adjacent the top of said cylinders, thus closing the top of the chamber 14. The cylinders 12 and 13 are provided on their outer and inner surfaces respectively with a plurality of downwardly extending grooves or channels and while these may be variously formed, in the embodiment of the invention illustrated, they are shown as corrugations extending helically about said cylinders. The cylinders 12 and 13 as shown extend a short distance above the partition 15 thus forming a trough 16. Another pair of cylinders 17 and 18 which are substantially concentric, are spaced a short distance to form a chamber 19 therebetween closed at its top and bottom by flanges connecting the cylinders 17 and 18. Cylinder 17 is of somewhat greater diameter than cylinder 12 so that the same is spaced a short distance outwardly of the cylinder 12. Cylinders 17 and 18 are shown as supported from the cylinder 12 by channel members 20 extending between cylinders 12 and 17 at the tops and bottoms thereof. A pipe or conduit 21 extends into the bottom of the chamber 14 through the cylinder 12 which is adapted to have another pipe or tube 22 connected thereto, which will in turn be connected to some source of water supply or supply of other cooling medium. A pipe or conduit 23 extends into the opposite side of the chamber 14 through the cylinder 12 and is bent at right angles and extended to a point adjacent the top of said chamber. The tube 23 is also adapted to be connected to a pipe or tube 24 through which water may be discharged from the chamber 14. A pipe or conduit 25 also extends into the bottom of the chamber 17 through the cylinder 18 adapted to have the pipe or tube 26 connected thereto which will extend to some suitable source of water supply or supply of other cooling medium. An outlet pipe 27 extends from the top of the chamber 19 through the cylinder 18 also shown as having a pipe or tube 28 connected thereto through which the cooling medium may be discharged from chamber 19. The trough 16 has a multiplicity of small holes $16^a$ extending therethrough at the inner and outer side thereof and closely adjacent the partition 15, which holes preferably will taper somewhat toward their outer ends and which will also preferably aline with the grooves or channels formed in the surface of the cylinders 12 and 13.

A member 29 of downwardly flaring shape is provided, having a lower terminal edge spaced above the trough 16 and substantially alined with the center thereof and while member 29 may be variously shaped, in the embodiment of the invention illustrated it is shown as substantially semispherical in form and supported from the cylinder 13 by a plurality of circumferentially spaced brackets 30. The upper or convex surface of the member 29 preferably is formed with a plurality of downwardly extending channels or grooves $29^a$ and while these may be variously arranged, in the embodiment of the invention illustrated they are shown as extending helically downward from the central portion thereof, as illustrated in Fig. 2. A plurality of circumferentially spaced strips or brackets 31 extend from the top of member 29 upwardly and are secured to the outside of and support a liquid receiving tank or receptacle 32. The tank 32 is shown as substantially cylindrical at its upper end, having an intermediate conical portion leading to a smaller cylindrical portion $32^a$ having a slightly curved bottom. The lower part of the portion $32^a$ has an opening $32^b$ extending therethrough. A float 33, shown as substantially cylindrical in form and of smaller diameter than portion $32^a$, is disposed in said portion and said float has spaced radially extending ribs $33^a$ engaging the wall of the portion $32^a$ to keep the float centrally disposed there. Float 33 is somewhat curved and tapered at its lower end and fits in and closes opening $32^b$.

In Fig. 8 the device is shown similar in all respects to the device above described, except that the cylinders 17 and 18 are supported upon a flange $40^a$ of a pan 40 through the walls of which the pipes 21 and 23 extend. The pan 40 has a delivery spout $40^b$ extending from one side thereof.

In operation the device will be disposed over the milk can as shown, with the receptacle 32 disposed under the cream spout of the separator. Water or other cooling medium will be circulated in chamber 14, entering through the pipe 21 and discharging from adjacent the top of said chamber through the pipe 24. A cooling medium will also be circulated in the chamber 19, entering through the pipe 25 and discharging from the pipe 27. The cream will flow down into the portion $32^a$ of the member 32 and through the aperture $32^b$. The float 33 will tend to cause an even flow of the liquid therearound and through the aperture $32^b$. Cream will be discharged into the member 29 and be distributed thereon in a comparatively thin film or layer and will flow through the grooves $29^a$ downwardly and outwardly on the convex surface of member 29 and will drop from the lower terminal edge thereof into the trough 16. From the trough 16 the cream will pass through the opening $16^a$ to the outer surface of the cylinder 12 and to the inner surface of the cylinder 13 and will flow in a thin film or layer and through the grooves in said surface downwardly. The cream will drop from the lower edges of the cylinders 12 and 13 into the can 10. The surface over which the cream flows will be kept quite cold by the cooling medium in the chambers 16 and 19 and the cream will be cooled as it passes downwardly and will drop into the can 10 in very cool condition. The chamber 19 about the cylinder 12 assists in keeping the outer surface of the cylinder 12 cool, protects said surface against a radiation of heat or the contact of hot air, and also protects the device from any dust or dirt or other substance which might be carried in the atmosphere.

In the modification shown in Fig. 8, the pan 40 will be supported in any suitable manner above the top of the cream can and the cream will be discharged from the bottom of cylinders 12 and 13 into the pan 40 and will flow out through the spout 40ᵇ into the cream pan.

From the above description it is seen that applicant has provided a very simple and extremely convenient and efficient cream cooler. The device is quite simple in construction, easily made and assembled and can be conveniently disposed in position for use. The same has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A cream or liquid cooling apparatus having in combination, spaced upstanding cylinders axially disposed to form a comparatively narrow annular chamber therebetween, means for circulating a cooling medium in said chamber, and a member at the upper ends of said cylinders having apertures therethrough for distributing the liquid to be cooled to the outer surfaces of said chamber, said surfaces being formed with downwardly extending grooves therein extending helically around said cylinders, the top ends of which are alined with said apertures.

2. The structure set forth in claim 1, and an annular cylindrical member surrounding said annular chamber and forming an annular chamber thereabout, and means for circulating a cooling medium through said last mentioned annular member.

3. A cream or liquid cooling apparatus having in combination, a receptacle for liquid having a distributing opening at its bottom, a downwardly flaring member receiving said liquid on its convex surface and having a lower terminal edge, a pair of substantially concentric spaced cylinders forming a narrow chamber therebetween, a partition between said cylinders adjacent the tops thereof forming a liquid receiving trough, said terminal edge being spaced over and alined with said trough, said trough having apertures at each side for distributing the liquid to be cooled to the outer walls of said chamber respectively, and means for circulating a cooling medium through said chamber.

4. A cream or liquid cooling apparatus having in combination, a receptacle, a distributing means below and receiving therefrom, a cooling member having spaced walls with a narrow chamber therebetween, means for receiving said liquid from said distributing member and distributing the same on the outer walls of said chamber, means for circulating a cooling medium through said chamber, a hollow casing surrounding said casing member and means for circulating a cooling medium in said hollow member.

5. A cream or liquid cooling apparatus having in combination, spaced upstanding cylinders, axially disposed to form a comparatively narrow annular chamber therebetween, means for circulating a cooling medium in said chamber, a trough at the upper ends of said cylinders having apertures therethrough for distributing the liquid to be cooled to the outer surfaces of said chamber, said surfaces being formed with downwardly extending grooves extending helically around said cylinders, a receptacle for liquid above said cylinders, a member for distributing liquid from said cylinders to said trough having helical grooves on its receiving surface delivering at their lower ends to said trough, whereby said liquid is uniformly delivered circumferentially to said trough.

6. A cream or liquid cooling apparatus having in combination, a receptacle adapted to contain liquid and having an opening in the bottom thereof, a distributing member below said receptacle disposed centrally in relation to said opening and having a concave surface receiving therefrom, a pair of substantially concentric spaced cylinders forming a narrow chamber therebetween, a partition between said cylinders adjacent the tops thereof forming a liquid receiving trough disposed below the edge of said distributing member, said trough having apertures at each side for distributing liquid to be cooled to the outer walls of said chambers respectively, and means for circulating a cooling medium through said chamber.

In testimony whereof I affix my signature.

NAPOLEON RAMGREN.